(12) United States Patent
Yellin et al.

(10) Patent No.: US 7,477,686 B2
(45) Date of Patent: Jan. 13, 2009

(54) APPARATUS AND METHOD OF ADAPTIVE FILTER

(75) Inventors: Daniel Yellin, Ra'anana (IL); Kobby Pick, Modiin (IL)

(73) Assignee: Intel Corporation, Santa Clara, CA (US)

(*) Notice: Subject to any disclaimer, the term of this patent is extended or adjusted under 35 U.S.C. 154(b) by 36 days.

(21) Appl. No.: 10/930,857

(22) Filed: Sep. 1, 2004

(65) Prior Publication Data

US 2006/0045203 A1    Mar. 2, 2006

(51) Int. Cl.
*H03H 7/30* (2006.01)

(52) U.S. Cl. ........................ 375/229; 375/230

(58) Field of Classification Search ............... 375/300, 375/232, 229, 230, 233; 371/291
See application file for complete search history.

(56) References Cited

U.S. PATENT DOCUMENTS

| | | | | |
|---|---|---|---|---|
| 5,309,482 A | * | 5/1994 | Wright et al. | 375/350 |
| 5,744,742 A | * | 4/1998 | Lindemann et al. | 84/623 |
| 5,768,124 A | * | 6/1998 | Stothers et al. | 700/38 |
| 6,008,703 A | | 12/1999 | Perrott et al. | |
| 6,301,298 B1 | * | 10/2001 | Kuntz et al. | 375/232 |
| 2004/0041638 A1 | | 3/2004 | Vilcooq et al. | |
| 2004/0183602 A1 | * | 9/2004 | Maunuksela et al. | 331/17 |

FOREIGN PATENT DOCUMENTS

WO    WO 2005/062563    7/2005

OTHER PUBLICATIONS

U.S. Appl. No. 10/734,117, filed Dec. 15, 2003, Yellin et al.
M. H. Perrot and M. D. Trott, "A Modeling Approach for Σ-Δ Fractional-N Frequency Synthesizers Allowing Straightforward Noise Analysis", IEEE Journal of Solid-State Circuits, vol. 37, pp. 1028-1038, Aug. 2002.
International Search Report for PCT/US2005/026707, mailed on Jan. 30, 2006.

* cited by examiner

*Primary Examiner*—Chieh M Fan
*Assistant Examiner*—Jaison Joseph
(74) *Attorney, Agent, or Firm*—Pearl Cohen Zedek Latzer LLP

(57) ABSTRACT

Briefly, according to some embodiments of the invention a method and apparatus to generate a filter are provided. The apparatus may include a phase modulation unit to vary a phase component of a signal, a measurement unit to measure a parameter of the phase modulation unit and a filter generator to generate a filter based on the parameter. In some embodiments of the invention, the filter is adapted to provide a compensated signal to the phase modulation unit to compensate for deviation of the parameter.

20 Claims, 3 Drawing Sheets

APPARATUS AND METHOD OF ADAPTIVE FILTER

BACKGROUND OF THE INVENTION

In polar modulation, a signal is separated into its instantaneous amplitude and phase/frequency components (rather than into the classical in-phase (I) and quadrature (Q) components), and the amplitude component and phase/frequency component are modulated independently. The amplitude component may be modulated with any suitable amplitude modulation (AM) technique, while the phase/frequency component may be modulated using an analog phase locked loop (PLL).

The bandwidth of the PLL may be quite small, much smaller than the actual bandwidth of the transmission signal's instantaneous phase/frequency. For example, in the case where the PLL is fed by a sigma-delta converter that has a high pass noise nature, the loop filter may be narrow enough to attenuate the sigma-delta quantization noise and the phase noise of the PLL. A pre-emphasis filter may emphasize, prior to modulation, those frequency components that would be attenuated by the PLL.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
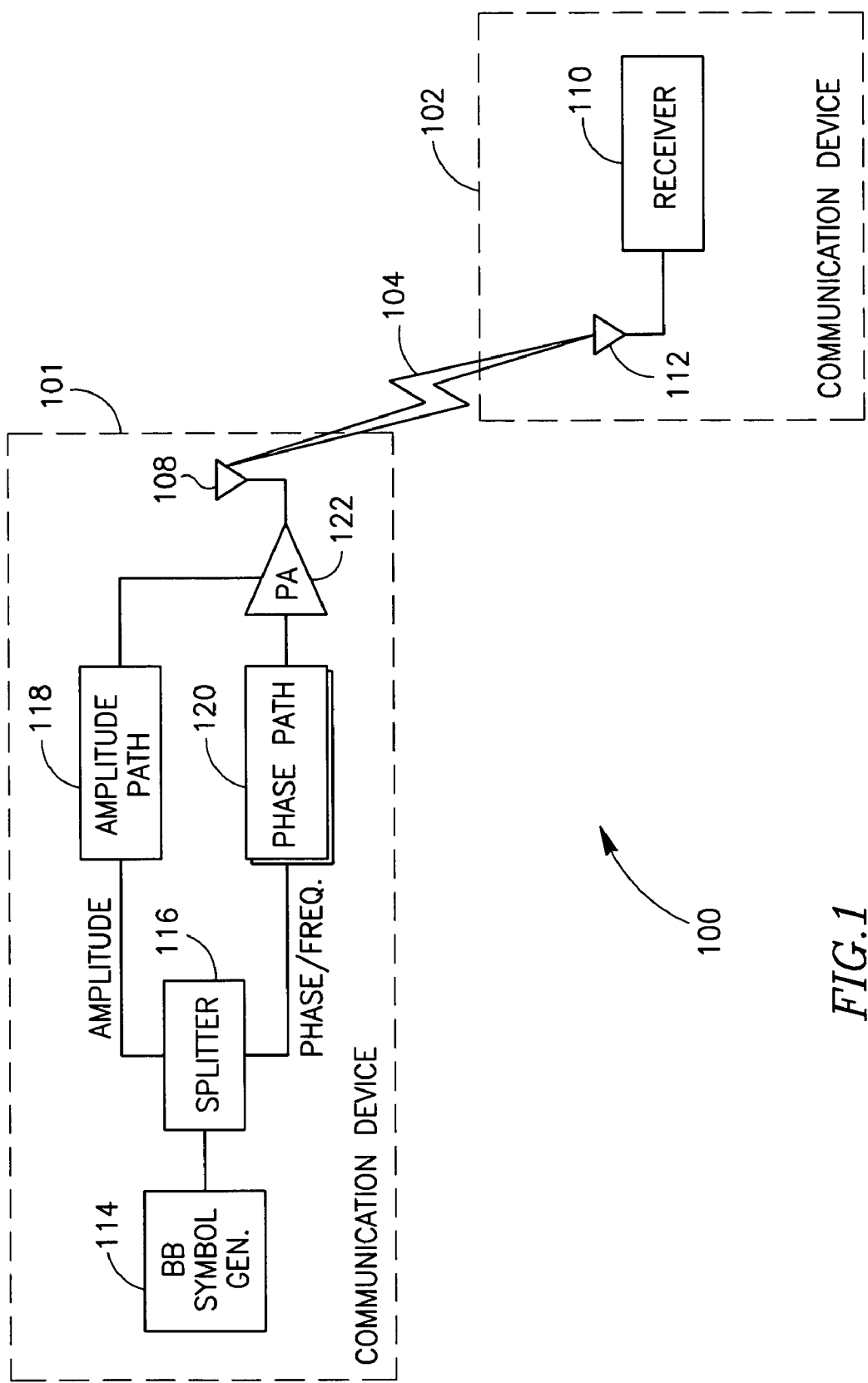
FIG. 1 is a block-diagram illustration of an exemplary communication system according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, receivers of a radio system or the like. Portable communication devices intended to be included within the scope of the present invention may include, by a way of example only, cellular radiotelephone portable communication devices, digital communication system portable devices and the like.

Types of cellular radiotelephone systems intended to be within the scope of the present invention include, although are not limited to, Code Division Multiple Access (CDMA) and WCDMA cellular radiotelephone portable devices for transmitting and receiving spread spectrum signals, Global System for Mobile communication (GSM) cellular radiotelephone, Time Division Multiple Access (TDMA), Extended-TDMA (E-TDMA), General Packet Radio Service (GPRS), Extended GPRS, and the like.

For simplicity, although the scope of the invention is in no way limited in this respect, embodiments of the present that will be described below may be related to a CDMA family of cellular radiotelephone systems that may include CDMA, WCDMA, CDMA 2000 and the like. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by a station of wireless communication system and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Turning first to FIG. 1, a block-diagram illustration of an exemplary wireless communication system 100 is shown. Although the scope of the present invention is not limited in this respect, wireless communication system 100 may include a communication device 101 and a communication device 102. According to some embodiments of the invention, communication device 101 may include a base band (BB) symbol generator 114, a splitter 116, an amplitude path 118, a phase path 120, a power amplifier 122 and one or more antennas, for example antenna 108. Communication device 102 may include at least a receiver 110 and one or more antennas, for example antenna 112.

Although the scope of the present invention is not limited to this embodiment, communication device 101 may communicate with communication device 102 over a communication channel 104, if desired. Although the scope of the invention is not limited in this respect, the communication system 100 may be part of a cellular communication system (with one of communication devices 101, 102 being a base station and the other a mobile station, or with both communication devices 100, 102 being mobile stations), a pager communication system, a personal digital assistant and a server, a wireless local area network (WLAN), a metropolitan area networks (WMAN) or the like.

Although the scope of the present invention is not limited in this respect, antennas 108 and 112 may be for example, a dipole antenna, a Yagi antenna, an internal antenna, a multi-pole antenna, and the like. According to embodiments of the invention, communication devices 101 may include a receiver and transmitter.

Although the scope of the present invention is not limited to this embodiment, baseband symbol generator 114 of communication device 101 may generate a signal of baseband symbols. Splitter 116 may split the signal into its instantaneous amplitude and phase/frequency components. Amplitude path 118 may modulate and amplify the amplitude components. Phase path 120 may include a phase modulator that may modulate and up-convert the phase/frequency components. Power amplifier 122 may amplify the output of phase modulator 120 with a gain controlled by the output of amplitude path 118. Antenna 108 may coupled to power amplifier (PA) 122 and may transmit the output of power amplifier 122. According to some exemplary embodiments of the invention, baseband symbol generator 114 may be implemented in accordance with a wireless standard, if desired. Splitter 116 may be implemented in hardware, software or firmware or any combination of hardware and/or software thereof. According to other embodiments of the present invention, an input of power amplifier 122 may be operably coupled to a multiplier (not shown), if desired.

Although the scope of the present invention is not limited in this respect, phase path 120 may include components that may compensate on deviation in parameters of phase path 120. Furthermore, phase path 120 may include a phase modulator to vary a phase component of a signal. According to embodiments of the invention, phase path 120 may output a compensated signal that may be amplified by PA 122.

Figure 2:
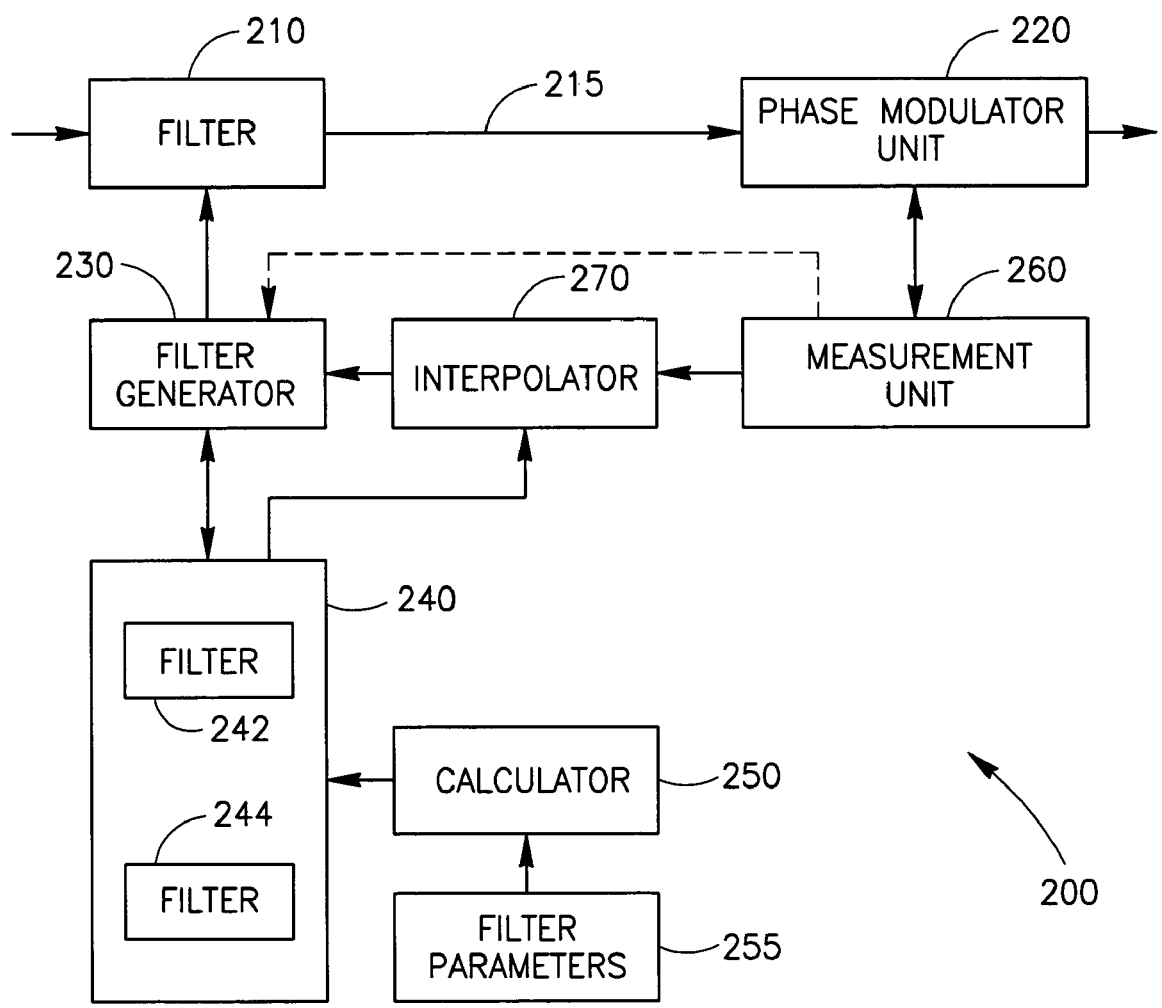
FIG. 2 is a block-diagram illustration of an exemplary phase path according to some embodiments of the invention.

Turning to FIG. 2 a block-diagram illustration of an exemplary phase path 200 according to an embodiment of the invention is shown. Although the scope of the present invention is not limited in this respect, phase path 200 may include a filter 210, a phase modulator unit 220, a filter generator 230, a memory 240 that may include filters 242 and 244, a calculator 250, one or more filter parameters 255, a measurement unit 260 and an interpolator 270.

Although the scope of the present invention is not limited to this embodiment, phase modulator unit 220 may include a phase lock loop (PLL), a synthesizer and the like (not shown). Phase modulator unit 220 may vary a phase component of a signal. Measurement unit 260 may measure one or more parameters of phase modulator unit 220. For example, measurement unit 260 may measure parameters such as, for example PLL open loop gain, loop filter cut off and the like. In one exemplary embodiment of the invention, filter generator 230 may receive the parameter from measurement unit 260 (e.g. shown with a dotted line) and may generate a filter based on the parameter, for example, filter 210. Filter 210 may provide a compensated signal 215 to phase modulation unit 220. Phase modulation unit 220 may use compensated signal 215 to compensate deviation of one or more parameters of phase modulator unit 220.

Although the scope of the present invention is not limited in this respect, in some embodiments of the invention, filter generator 230 may calculate filter 210, in some other embodiments calculator 250 may calculate filter 210 and in other embodiments of the invention filter generator 230 and calculator 250 may be embedded into a single unit, if desired. In this exemplary embodiment of the invention, calculator 250 may calculate a coefficients vector $\overline{C}=F\{\overline{X}\}$ of filter 210 where:

$\overline{X}$—may be a vector of parameters of dimension N; and
$F$—may be a function that makes optimal mapping of the vector $\overline{X}$ to the coefficients vector $\overline{C}$.

According to some embodiments of the invention filter 210 may be implemented as Immediate Impulse Response (IIR) filter, were $\overline{C}$ may include Nz zeros and Np poles. Thus, $\overline{C}$ may include Nc coefficients, where $N_C=N_Z+N_P+2$. It should understand that the present invention is in no way limited to IIR filter or to Finite Impulse Response (FIR) filter. Other types of filters may be used with embodiments of the invention.

Additionally and/or alternatively, the vector of measured parameters may be $$\overline{X}_{Actual} = \begin{bmatrix} x_{Act0} \\ x_{Act1} \\ \cdot \\ x_{ActN-1} \end{bmatrix}$$

an optimal coefficient vector $\overline{C}$ may be calculated by $\overline{C}_{Opt}=F\{\overline{X}_{Actual}\}$ According to some embodiments of the invention, filter generator 230 and/or calculator 250 may repeat the above calculation if the value of $\overline{X}_{Actual}$ varied.

Although the scope of the present invention is not limited in this respect, calculator 250 may calculate one or more predetermined filters for example, filters 242 and 244, based on one or more filter parameters 255. For example, filter 242 may include a set of $k_0$ and $w_0$ parameters wherein, $k_0$ may be a PLL open loop gain parameter and $w_0$ may be filter bandwidth parameters. In a similar manner, filter 244 may include $k_1$ and $w_1$ filter parameters, if desired. In this exemplary embodiment, filters 242 and 244 may be stored in memory 240. Memory 240 may be a Flash memory, random access memory (RAM) or the like. Interpolator 270 may interpolate one or more measured parameters $\overline{X}_{Actual}$ with the two or more stored predetermined filters. Interpolator 270 may interpolate the parameters according to interpolation function $\hat{F}$, if desired. Filter generator 230 may generate and/or calculate filter 210 base on the one or more predetermined filters that stored in memory 240 and/or interpolated filter parameters provided by interpolator 270, if desired. For example, filter generator 230 may generate filter 210 according to $\overline{C}_{Opt}=F\{\overline{X}_{Actual}\}$, were $\overline{C}_{Opt}$ may be an optimal vector of coefficients of filter 210. In the art of digital signal processing, memory 240 may be referred as a bank of filters, although the scope of the present invention is not limited in this respect.

Although the scope of the present invention is not limited in this respect, calculator 250 may calculate two or more predetermined filters based on combinations of two or more filter parameters. In some embodiments of the invention the predetermined filters may be pre-calculation and the calculations results for example filters coefficients of may be stored in memory 240. In other embodiments of the invention, the predetermined filters may be calculated and stored according to a request and/or periodically, if desired.

Figure 3:
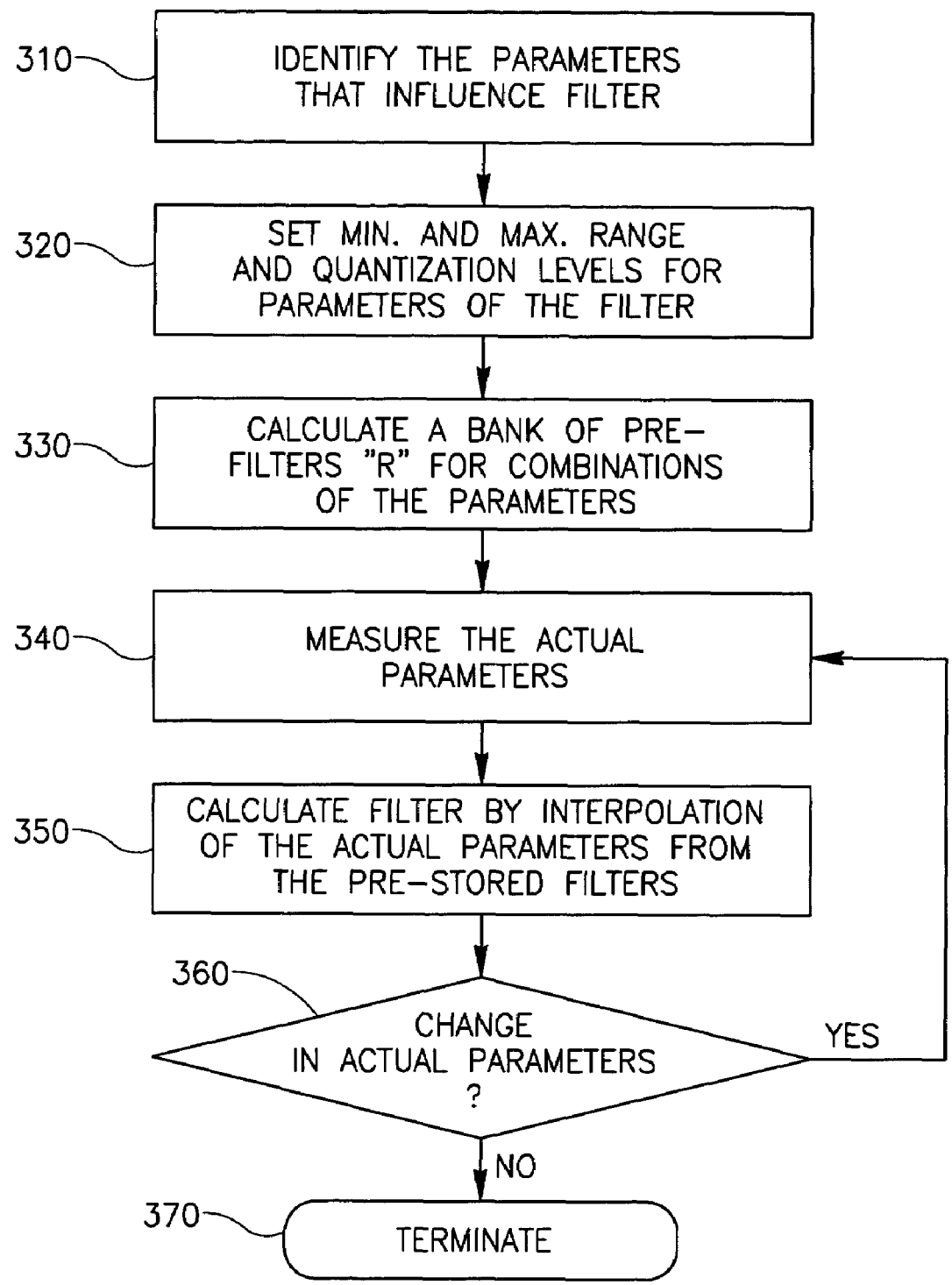
FIG. 3 is a flowchart illustration of a method to generate a filter according to some exemplary embodiments of the invention.

Turning to FIG. 3 a flow chart of a method of generating a filter according to exemplary embodiment of the invention is shown. Although the scope of the present invention is not limited in this respect, the method may begin with identifying one or more parameters that may influence filter 210 (text block 310). The parameters may be parameters of phase modulation unit 220 (as is shown in FIG. 2) such as, for example voltage controlled oscillator (VCO) gain K, fractional N synthesizer division ratio, loop filter H(s) and the like. The parameters may be represented by a vector. A parameter in vector $\overline{X}$ may have a minimum and maximum value and quantization levels. For example, a grid vector $x_k$ may be defined for parameter $x_k$ of $\overline{X}$ with all possible quantization levels (text block 320).

In addition, $m_k$ may be denoted as the size of vector $\overline{x}_k$ (number of quantization levels of $x_k$) and $\overline{M}$ may be denoted as the vector of all $m_k$. Accordingly, R may be a matrix of the predetermined filters. Matrix R may be an N dimension matrix where a size of a dimension may be determined by $\overline{M}$. An element may be a vector of dimension $C_N$. Vector $\overline{I}$ may be the vector of indexes of the $\overline{x}_k$ vectors where $\overline{I} = \{i_0, i_1, \ldots, i_{N-1}\}$.

According to some embodiments of the invention calculator 250 may calculate matrix R of predetermined filters (e.g. filters 242, 244) according to $$\overline{R}(\overline{I}) = \overline{R}(\overline{X}(\overline{I})) = \overline{F}\{\overline{X}(\overline{I})\} = F \left\{ \begin{array}{c} x_0 = \overline{x}_0(i_0) \\ x_1 = \overline{x}_1(i_1) \\ \cdot \\ x_{N-1} = \overline{x}_{N-1}(i_{N-1}) \end{array} \right\}$$

(test block 330).

Matrix R may have an N dimension total of $$\prod_{k=0}^{N-1} m_k$$

elements, where an element may be a vector of $N_c$ dimensions. For the clearness of the description, matrix R may be stored in memory 240 and may be referred as pre-stored filters, although the scope of the present invention is not limited in this respect.

According to embodiments of the invention, measurement unit 250 may measure actual parameters of phase modulation unit 220 (text block 340). For example, $$\overline{X}_{Actual} = \begin{bmatrix} x_{Act0} \\ x_{Act1} \\ \cdot \\ x_{ActN-1} \end{bmatrix}$$

may be a vector of the actual parameters and optimal $\overline{C}$ (e.g. the vector of filter 210) may be $\overline{C}_{Opt} = \overline{F}\{\overline{X}_{Actual}\}$. Filter generator 230 may generate filter 220 by interpolation of the actual parameters, e.g. $\overline{X}_{Actual}$ from pre-stored filters, e.g. matrix R (text block 350) according to $$\hat{\overline{C}}_{Opt} = \hat{\overline{F}}\{\overline{X}_{Actual}, R\},$$

if desired. In some embodiments of the invention, the calculation of filter 210 may be repeated according to variations of the measured parameters, e.g. $\overline{X}_{Actual}$ (text block 360) or may be terminated (text block 370) if no change in measured parameters occurred.

Although the scope of the present invention is not limited to this respect, phase modulation unit 220 may be a phase lock loop (PLL) (not shown) and may include, VCO, fraction-N-synthesizer and other components. In this embodiment filter 210 may be calculated as follows:

The transfer function of phase modulation unit 220 may be $$\frac{Y(s)}{X(s)} = \frac{(K_V/(N+\beta)) \cdot H(s)/s}{1 + (K_V/(N+\beta)) \cdot H(s)/s} = \frac{K \cdot H(s)/s}{1 + K \cdot H(s)/s}$$

$$K = K_V/(N+\beta)$$

where:
$K_v$—may be the VCO gain;
N—may be integer frequency division ratio;
$\beta$—may be fractional frequency division ratio; and
H(s)—may be the loop filter.

The transfer function of filter 210 may be:

$$\frac{X(s)}{W(s)} = \frac{1 + K \cdot H(s)/s}{K \cdot H(s)/s}, s = j \cdot 2 \cdot \pi \cdot f, f < f_0$$

If H(s) may be composed of zeros and poles then $\Delta p$ may be denoted as the variation of the zeros and poles from their nominal value, and $\Delta k$ may be denoted as the variation of K from its nominal value.

Thus:

$$\overline{X} = \begin{bmatrix} \Delta p \\ \Delta k \end{bmatrix}; \text{ and}$$

$$\overline{C} = \overline{F}\{\overline{X}\}$$

The minimum and maximum range of $\Delta p$ and $\Delta k$ may be set to ±Pmax and ±Kmax respectively. The grid may be set to dp and dk, respectively.

According to this embodiment of the invention, matrix R may consist of (2·P max/dp+1)·(2·K max/dk+1) elements, where an element may be a vector of dimension $N_c$.

Assuming that the actual values are:

$$\overline{X}_{Actual} = \begin{bmatrix} \Delta p_{Act} \\ \Delta k_{Act} \end{bmatrix}; \text{ and}$$

Assuming that $\hat{\bar{F}}$ is a linear interpolation then $$\hat{\bar{C}}_{Opt}$$

may be calculated by:

$$\hat{\bar{C}}_{Opt} = \hat{\bar{F}}(\overline{X}_{Actual}) = \nabla \overline{F}(\overline{X}_{Actual})|_{\overline{X}_{Actual}=\overline{X}_0} \cdot (\overline{X}_{Actual} - \overline{X}_0) + \overline{F}(\overline{X}_0)$$

$$\overline{F}(\overline{X}_{Actual}) = \begin{bmatrix} f_0(\overline{X}_{Actual}) \\ f_1(\overline{X}_{Actual}) \\ \cdot \\ f_{N_c-1}(\overline{X}_{Actual}) \end{bmatrix}, \overline{X}_{Actual} = \begin{bmatrix} \Delta p_{Act} \\ \Delta k_{Act} \end{bmatrix}, \overline{X}_0 = \begin{bmatrix} \Delta p_0 \\ \Delta k_0 \end{bmatrix}$$

$$\nabla \overline{F}(\overline{X}_{Actual}) = \begin{bmatrix} \frac{\partial \overline{F}(\overline{X}_{Actual})}{\partial \Delta p} & \frac{\partial \overline{F}(\overline{X}_{Actual})}{\partial \Delta k} \end{bmatrix}$$

$$\frac{\partial \overline{F}(\overline{X}_{Actual})}{\partial \Delta p} = \begin{bmatrix} \frac{\partial f_0(\overline{X}_{Actual})}{\partial \Delta p} \\ \frac{\partial f_1(\overline{X}_{Actual})}{\partial \Delta p} \\ \cdot \\ \frac{\partial f_{N_c-1}(\overline{X}_{Actual})}{\partial \Delta p} \end{bmatrix}$$

where:

$\overline{X}_0$—may be defined as the closest point to $\overline{X}_{Actual}$; and $\hat{\bar{F}}(\overline{X}_{Actual})$—may be the linear interpolation function.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method of adapting a filter for compensating deviation of actual parameter of a phase modulation unit in a polar modulation transmitter, the method comprising:
measuring actual parameters related to a phase modulation unit, wherein the actual parameters comprise a Voltage controlled oscillator gain ($K_v$), an integer frequency division ratio (N), a fractional division ratio ($\beta$) and loop filter ($H_{(S)}$); and
generating the filter based on measured values of the actual parameters and stored predetermined filters coefficients for providing a compensated signal to compensate deviation of the at least one actual parameter of the phase modulation unit.

2. The method of claim 1 comprising:
generating a matrix of predetermined filters coefficients based on one or more filter parameters; and
storing said matrix in a memory.

3. The method of claim 1, wherein generating the filter comprises:
generating the filter based on the transfer function:

$$\frac{X(s)}{W(s)} = \frac{1 + K \cdot H(s)/s}{K \cdot H(s)/s}, s = j \cdot 2 \cdot \pi \cdot f, f < f_0$$

wherein,
X(S) is a matrix of parameters of dimension N and
W(S) is a matrix of filter bandwidth parameters.

4. The method of claim 1 comprising interpolating the actual parameter with the two or more stored predetermined filters coefficients.

5. A communication device comprising:
a phase modulation unit to vary a phase component of a signal;
a measurement unit to measure a voltage controlled oscillator gain ($K_v$), an integer frequency division ration(N), a fractional division ratio ($\beta$) and a loop filter ($H_{(s)}$), wherein $K_v$, N, $\beta$, and $H_{(s)}$ are actual parameters of the phase modulation unit;
a filter generator to generate a filter based on the actual parameters and a predetermined filter of a matrix of predetermined filters, wherein the filter is adapted to provide a compensated signal to the phase modulation unit to compensate for deviation of at least one actual parameter of the actual parameters $K_v$, N, $\beta$, and $H_{(S)}$.

6. The communication device of claim 5 comprising a memory to store a matrix of predetermined filters.

7. The communication device of claim 5, wherein the filter generator generates the filter based on the transfer function:

$$\frac{X(s)}{W(s)} = \frac{1 + K \cdot H(s)/s}{K \cdot H(s)/s}, s = j \cdot 2 \cdot \pi \cdot f, f < f_0$$

wherein,
X(S) is a matrix of parameters of dimension N and
W(S) is a matrix of filter bandwidth parameters.

8. The communication device of claim 5 comprising an interpolator to interpolate the actual parameter with the matrix of predetermined filters.

9. A communication device comprising:
an internal antenna to transmit a signal;
an amplitude path and a phase path to provide polar modulation to the signal, both operably coupled to a power amplifier and wherein the phase path comprises:
a matrix of predetermined filters stored in a memory;
a phase modulation unit to vary a phase component of the transmit signal;
a measurement unit to measure a voltage controlled oscillator gain ($K_v$), an integer frequency division ratio (N), a fractional division ratio ($\beta$) and a loop filter ($H_{(S)}$), wherein $K_v$, N, $\beta$ and $H_{(S)}$ are actual parameters of the phase modulation unit; and
a filter generator to generate a filter based on the actual parameters and a predetermined filter of a matrix of predetermined filters, wherein the filter is adapted to provide a compensated signal to the phase modulation unit to compensate for deviation of at least one actual parameter of the actual parameters $K_v$, N, $\beta$ and $H_{(S)}$.

10. The communication device of claim 9 comprising a memory to store a matrix of predetermined filters.

11. The communication device of claim 9, wherein the filter generator generates the filter based on a transfer function:

$$\frac{X(s)}{W(s)} = \frac{1 + K \cdot H(s)/s}{K \cdot H(s)/s}, s = j \cdot 2 \cdot \pi \cdot f, f < f_0$$

wherein,

X(S) is a matrix of parameters of dimension N and

W(S) is a matrix of filter bandwidth parameters.

12. The communication device of claim 9 comprising an interpolator to interpolate the actual parameter with the matrix of predetermined filters.

13. A communication system for generating a filter in a transmitter comprising, in a transmitter:

a wireless communication device that includes a phase modulation unit to vary a phase component of a signal;

a measurement unit to measure a voltage controlled oscillator gain ($K_v$), an integer frequency division ratio (N), a fractional division ratio ($\beta$) and a loop filter ($H_{(S)}$), wherein $K_v$, N, $\beta$ and $H_{(S)}$ are actual parameters of the phase modulation unit; and a filter generator to generate a filter based on the actual parameters and a predetermined filter of a matrix of predetermined filters, wherein the filter is adapted to provide a compensated signal to the phase modulation unit to compensate for deviation of at least one actual parameter of the actual parameters $K_v$, N, $\beta$ and $H_{(S)}$.

14. The communication system of claim 13 comprising a memory to store a matrix of predetermined filters.

15. The communication system of claim 13, wherein the filter generator generates the filter based on a transfer function:

$$\frac{X(s)}{W(s)} = \frac{1 + K \cdot H(s)/s}{K \cdot H(s)/s}, s = j \cdot 2 \cdot \pi \cdot f, f < f_0$$

wherein,

X(S) is a matrix of parameters of dimension N and

W(S) is a matrix of filter bandwidth parameters.

16. The communication system of claim 13 comprising an interpolator to interpolate the actual parameter with the matrix of predetermined filters.

17. An article for generating a filter in a transmitter comprising storage medium, having stored thereon instructions that, when executed, result in, in a transmitter:

measuring actual parameters related to a phase modulation unit, wherein the actual parameters comprise a Voltage controlled oscillator gain ($K_v$), an integer frequency division ratio (N), a fractional division ratio ($\beta$) and loop filter ($H_{(S)}$); and generating the filter based on measured values of the actual parameters and stored predetermined filters coefficients for providing a compensated signal to compensate deviation of the at least one actual parameter of the phase modulation unit.

18. The article of claim 17 wherein the instructions when executed result in:

generating a matrix of predetermined filters coefficients based on one or more filter parameters; and storing said matrix in a memory.

19. The article of claim 17, wherein generating the filter comprises:

generating the filter based on the transfer function $$\frac{X(s)}{W(s)} = \frac{1 + K \cdot H(s)/s}{K \cdot H(s)/s}, s = j \cdot 2 \cdot \pi \cdot f, f < f_0$$

wherein,

X(S) is a matrix of parameters of dimension N and

W(S) is a matrix of filter bandwidth parameters.

20. The article of claim 17 wherein the instructions when executed result in interpolating the actual parameter with the two or more stored predetermined filters coefficients.

* * * * *